Jan. 31, 1956  T. M. DUNHAM  2,733,037
SHELF ATTACHING AND SUPPORTING MEANS
Filed Sept. 20, 1952
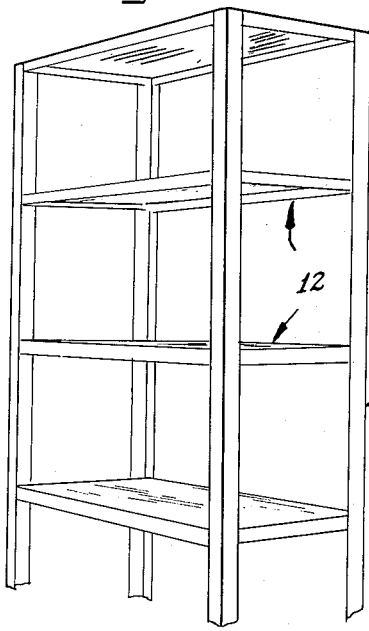
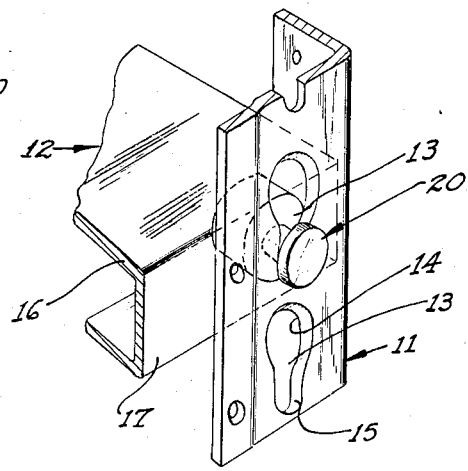
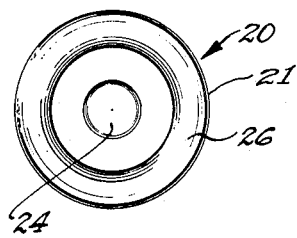
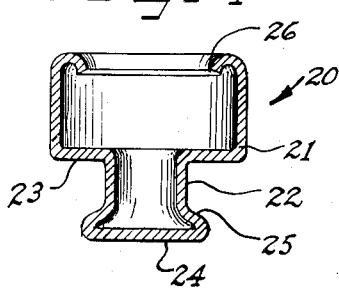
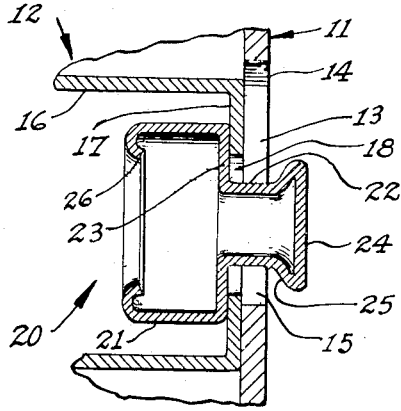
Inventor:
Thomas M. Dunham
by Hill, Sherman, Meroni, Gross & Simpson Attys

United States Patent Office 2,733,037
Patented Jan. 31, 1956

2,733,037

SHELF ATTACHING AND SUPPORTING MEANS

Thomas M. Dunham, Aurora, Ill., assignor to Aurora Equipment Company, Aurora, Ill., a corporation of Illinois Application September 20, 1952, Serial No. 310,697

1 Claim. (Cl. 248—239)

This invention relates to an attaching stud for use in joining members, such as shelf members, together, and more particularly to a hollow attaching stud.

The subject matter of this invention is a continuation-in-part of that disclosed in my co-pending patent application, Serial No. 662,847, filed April 17, 1946 now Patent No. 2,639,043 dated May 19, 1953.

An object of this invention is to provide a hollow attaching stud for insertion in aligned openings of members to be joined and which is not only exceedingly light in weight but is also economical to fabricate.

In accordance with the general features of this invention there is provided an attaching stud for insertion in aligned openings of members, such as shelf members, to be joined together and which stud comprises an elongated body having in longitudinal alignment an enlarged tubular head, a reduced hollow neck, and an end cap of larger diameter than said neck, with said neck portion positioned between the cap and head for insertion in the openings of said members.

Yet, another feature of this invention relates to the provision of a hollow attaching stud with an intermediate reduced neck portion adapted to extend through an opening in a shelf member as well as through a keyhole shaped opening in another member and movable in the keyhole shaped opening to wedge the shelf members together.

Other objects and features of this invention will more fully appear from the following detailed description taken in connection with the accompanying drawings which illustrate a single embodiment thereof and in which:

Figure 1 is a somewhat diagrammatic perspective view of a type of shelf construction in which my novel attaching stud can be used with advantage;

Figure 2 is a fragmentary enlarged perspective view showing my novel stud applied to horizontal and vertical members of the shelf construction of Figure 1 for joining said members together;

Figure 3 is an enlarged end view of my novel tubular stud looking at the stud from its open end;

Figure 4 is a cross-sectional view through the stud shown in Figure 3; and

Figure 5 is an enlarged fragmentary vertical cross-sectional view taken through the members shown in Figure 2 and showing how my novel stud is employed to join the two members together.

As shown on the drawings:

In Figure 1 I have illustrated more or less diagrammatically a type of metal shelving 10 to which my invention is applicable and which includes four angular metal vertical posts or uprights 11 and spaced horizontal metal shelves 12. For simplicity I have not shown the details such, for example, as the keyhole-shaped openings in the vertical posts which, however, further are shown in Figure 2 and are designated by the reference character 13.

Each leg or post 11 is equipped with a series of spaced keyhole-shaped openings 13 so that the shelves 12 may be secured adjustably in a number of different positions as is well known in the art. My invention is particularly concerned with a stud 20 which I shall describe more in detail hereinafter and which is adapted for adjustable use in a keyhole-shaped opening.

Each keyhole-shaped opening includes a larger portion 14 and a restricted portion 15 and is adapted to be brought into register with an opening 18 in a flange 17 integral or fastened to the horizontal portion 16 of a shelf 12. In other words, the shelf 12 has its margins defined by an angular structure including a vertical flange 17 which may be integral or otherwise fastened to the shelf in the manner well known familiar with the metal shelving.

Now, I propose, in accordance with the features of this invention, to provide a simplified form of tubular stud 20 adapted for positioning in a keyhole-shaped opening 13 and an opening 18 aligned therewith in the shelf flange 17 as best shown in Figure 5.

This stud 20 may be fabricated in any suitable manner from sheet metal although it is contemplated that it can be economically made by suitable press operations, swaging or the like. Any suitable number of studs may be used depending upon the number of shelves there being four for each shelf or, in other words, one for each corner post 11 to be attached to the shelf.

Each stud 20 comprises a tubular elongated body (Figs. 3 and 4) including a hollow head 21 merging into a reduced hollow neck portion 22, there being a radial shoulder 23 between the head 21 and the neck 22. The other end of the neck 22 is enlarged and formed or collapsed into a multiple thickness cap having an inclined reinforcing peripheral edge 25 merging into the neck 22.

In addition, the cylindrical stud 20, if it is so desired, may have the free end of the head 21 turned or rolled inwardly into an edge 26 which will eliminate the presence of a sharp edge which might cut someone handling the stud. This turned or rolled edge has the additional advantage of better resisting deformation of the stud upon receipt of a heavy blow either directly to the stud or on some other adjoining surface.

The use or application of the stud 20 is clearly shown in Figure 5. It is inserted from the underside of the shelf through an opening 18 in the flange 17 of the shelf. That is to say, the cap end 24 is of a diameter such that it will pass through the opening 18 and through an enlarged portion 14 of a keyhole-shaped opening 13. This brings the enlarged tubular head 21 flush against the inner surface of the shelf flange or skirt 17 and the cap 24 beyond the exterior surface of the leg 11. Thereafter the neck portion 22 of the stud can be wedged downwardly into the reduced portion 15 of the keyhole-shaped slot thereby resulting in the shelf flange 17 being tightly and frictionally anchored to the vertical or upright post 11.

Removal of the stud may be easily effected by raising the shelf and the stud 20 to bring its neck portion into alignment with the enlarged portion 14 of the keyhole-shaped opening and thereafter the stud may be pushed through the keyhole-shaped opening into the interior of the underside of the shelf.

Attaching studs, such as the stud 20, are not only cheap to manufacture from sheet metal but are also relatively strong due to the bends or corrugations in the metal. In addition, as distinguished from solid studs, they are lighter and, in addition, will reduce the overall weight of the shelving unit such as the unit 10. It will be appreciated that if many shelves are used quite a few studs will also be used since there are at least four to each shelf.

I claim as my invention:

In an attaching structure for joining a shelving member to upright members and which shelving member has openings aligned with camming keyhole shaped openings in the upright member, an attaching stud comprising a one piece elongated hollow sheet metal body having in longitudinal alignment an enlarged head for abutting one of said members around the edge of one of said openings, a reduced tubular neck for disposition in said openings and for wedging engagement in the keyhole shaped opening and an end cap of larger diameter than said neck but of smaller diameter than that of said head so that it can pass through the enlarged end of the keyhole shaped opening when the stud is being inserted in or removed from the openings, said cap being smoothly merged into said neck by an inclined rigid annular radial reinforcing shoulder between the head and the neck and terminating radially inwardly in the neck for reinforcing the frictional engagement of the neck with the edge of the keyhole shaped opening, said hollow head having a rigid shoulder generally at right angles to said neck and confronting and cooperating with said inclined shoulder on said cap to resist endwise collapsing of said hollow body when the stud is under stress in attaching use.

References Cited in the file of this patent

UNITED STATES PATENTS

| | | |
|---|---|---|
| 257,945 | Hoover | May 16, 1882 |
| 298,303 | Krementz | May 6, 1884 |
| 316,194 | Smith | Apr. 21, 1885 |
| 2,133,781 | Johnson | Oct. 18, 1938 |
| 2,141,892 | Wilson | Dec. 27, 1938 |
| 2,604,213 | Bales et al. | July 22, 1952 |

FOREIGN PATENTS

| | | |
|---|---|---|
| 377,770 | Great Britain | Aug. 4, 1932 |
| 619,262 | France | Dec. 28, 1926 |